(12) United States Patent
Tsai et al.

(10) Patent No.: US 11,123,821 B2
(45) Date of Patent: Sep. 21, 2021

(54) LASER CUTTING METHOD

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Min-Che Tsai, Guangdong (CN); Shih-Lun Lai, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 318 days.

(21) Appl. No.: 16/018,088

(22) Filed: Jun. 26, 2018

(65) Prior Publication Data
US 2019/0366482 A1 Dec. 5, 2019

(30) Foreign Application Priority Data
Jun. 1, 2018 (CN) .......................... 201810555628.6

(51) Int. Cl.
| | | |
|---|---|---|
| *B23K 26/38* | (2014.01) | |
| *B23K 26/06* | (2014.01) | |
| *G02B 5/30* | (2006.01) | |
| *B23K 101/00* | (2006.01) | |
| *B32B 37/12* | (2006.01) | |

(52) U.S. Cl.
CPC .......... *B23K 26/38* (2013.01); *B23K 26/0626* (2013.01); *G02B 5/3025* (2013.01); *B23K 2101/00* (2018.08); *B32B 37/12* (2013.01)

(58) Field of Classification Search
CPC B23K 26/38; B23K 26/0626; B23K 26/0823; B23K 26/03; B23K 26/705; B23K 26/402; B23K 2103/54; B23K 2101/00; G02B 5/3025; G02B 27/281; B32B 37/12
USPC ..................................................... 219/121.67
See application file for complete search history.

(56) References Cited

U.S. PATENT DOCUMENTS

| | | | | |
|---|---|---|---|---|
| 4,502,762 | A * | 3/1985 | Anderson | B23K 26/02 359/484.03 |
| 4,764,930 | A * | 8/1988 | Bille | A61F 9/008 372/12 |
| 4,908,493 | A * | 3/1990 | Susemihl | B23K 26/06 219/121.67 |
| 6,038,054 | A * | 3/2000 | Sakai | G02B 5/3016 349/115 |
| 8,988,777 | B2 * | 3/2015 | Kajikawa | B23K 26/0617 359/489.01 |
| 2004/0002199 | A1* | 1/2004 | Fukuyo | B23K 26/03 438/460 |
| 2004/0102764 | A1* | 5/2004 | Balling | A61F 9/008 606/5 |
| 2005/0110988 | A1* | 5/2005 | Nishiyama | G01N 21/95684 356/237.5 |

(Continued)

*Primary Examiner* — Eric S Stapleton
(74) *Attorney, Agent, or Firm* — CKC & Partners Co., LLC

(57) ABSTRACT

The present disclosure provides a laser cutting method. The laser cutting method is applied to cut a polarizer. The method includes: providing a non-linearly polarized light; adjusting the non-linearly polarized light to a first linearly polarized light by a polarization adjusting device; and cutting the polarizer by the first linearly polarized light.

5 Claims, 5 Drawing Sheets

(56) References Cited

U.S. PATENT DOCUMENTS

| | | | |
|---|---|---|---|
| 2006/0055834 A1* | 3/2006 | Tanitsu | G03B 27/42 |
| | | | 349/5 |
| 2010/0002731 A1* | 1/2010 | Kimura | H01S 3/09415 |
| | | | 372/10 |
| 2010/0067212 A1* | 3/2010 | Kamada | G02B 27/281 |
| | | | 359/489.01 |
| 2011/0019274 A1* | 1/2011 | Kobayashi | G02B 5/3025 |
| | | | 359/485.01 |
| 2011/0180521 A1* | 7/2011 | Quitter | B23K 26/03 |
| | | | 219/121.73 |
| 2011/0309060 A1* | 12/2011 | Iwaki | B23K 26/40 |
| | | | 219/121.72 |
| 2011/0310450 A1* | 12/2011 | Amada | G02B 26/105 |
| | | | 359/196.1 |
| 2011/0316200 A1* | 12/2011 | Iwaki | B23K 26/064 |
| | | | 264/400 |
| 2012/0012758 A1* | 1/2012 | Kajikawa | B23K 26/0617 |
| | | | 250/492.1 |
| 2015/0331205 A1* | 11/2015 | Tayebati | G02B 6/4206 |
| | | | 385/27 |
| 2017/0120389 A1* | 5/2017 | Lee | G02B 5/3033 |
| 2018/0003860 A1* | 1/2018 | Cho | G02B 1/18 |
| 2019/0151993 A1* | 5/2019 | Subkhangulov | B23K 26/38 |

* cited by examiner

LASER CUTTING METHOD

CROSS-REFERENCE TO RELATED APPLICATION

This application claims priority to Chinese Application Serial Number 201810555628.6, filed Jun. 1, 2018, which is herein incorporated by reference in its entirety.

BACKGROUND

Field of Invention

The present invention relates to a laser cutting method.

Description of Related Art

In general, a cutting method may include a drill cutting method and/or a waterjet cutting method. The drill cutting method may use a rotary cutting drill to cut a substrate. However, the rotary cutting drill will make substrate vibrate during the cutting. Therefore, the drill cutting method is able to be used on a substrate with substantial thicknesses and/or lower elasticity to avoid damage to the substrate or to avoid offset of the substrate due to vibration during the cutting. Furthermore, in addition to a low accuracy of the drill cutting method, unnecessary burrs are generated at edges of the substrate.

On the other hand, the waterjet cutting method uses a rotary cutting slice and injects water for cutting simultaneously. However, it is necessary to inject water for cooling while performing the cutting. After the cutting is completed, subsequent operation such as baking is required, thereby increasing production costs and manufacturing time of the product. Therefore, how to solve the foregoing problems is a problem that those skilled in the art have always faced.

SUMMARY

The present disclosure provides a laser cutting method. The laser cutting method is applied to cut a polarizer. The method includes: providing a non-linearly polarized light; adjusting the non-linearly polarized light to a first linearly polarized light by a polarization adjusting device; and cutting the polarizer by the first linearly polarized light.

In some embodiments of the present disclosure, before cutting the polarizer by the first linearly polarized light, the method further includes: rotating an optical axis of the polarization adjusting device relative to an optical axis of the polarizer to reduce a light intensity of a second linearly polarized light that is formed after the first linearly polarized light passes through the polarizer.

In some embodiments of the present disclosure, before cutting the polarizer by the first linearly polarized light, the method further includes: stopping rotating the optical axis of the polarization adjusting device relative to the optical axis of the polarizer when the light intensity of the second linearly polarized light is lower than or substantially equal to a low intensity point.

In some embodiments of the present disclosure, before cutting the polarizer by the first linearly polarized light, the method further includes: maintaining the light intensity of the second linearly polarized light when the light intensity of the second linearly polarized light is lower than or substantially equal to a low intensity point.

In some embodiments of the present disclosure, maintaining the light intensity of the second linearly polarized light is performed when the light intensity of the second linearly polarized light is substantially equal to zero.

In some embodiments of the present disclosure, before cutting the polarizer by the first linearly polarized light, the method further includes: making an optical axis of the polarization adjusting device be orthogonal to an optical axis of the polarizer.

In some embodiments of the present disclosure, before cutting the polarizer by the first linearly polarized light, the method further includes: focusing the first linearly polarized light to the polarizer.

In some embodiments of the present disclosure, cutting the polarizer by the first linearly polarized light includes: increasing a light intensity of the non-linearly polarized light to cut the polarizer.

In some embodiments of the present disclosure, adjusting the non-linearly polarized light to the first linearly polarized light by the polarization adjusting device is adjusting the non-linearly polarized light to the first linearly polarized light by another polarizer.

In some embodiments of the present disclosure, adjusting the non-linearly polarized light to the first linearly polarized light by the polarization adjusting device is adjusting the non-linearly polarized light to the first linearly polarized light by a quarter-wave plate.

In the aforementioned configurations, the non-linearly polarized light is adjusted into the first linearly polarized light and is focused on the adhesive material of the object to be cut. Further, the first linearly polarized light is adjusted into the second linearly polarized light through the adhesive material. When the detector detects that the light intensity of the second linearly polarized light is lower than or substantially equal to the low intensity point, the light intensity of the non-linearly polarized light will be increased to remove the second area of the adhesive material. Hence, the adhesive material of the object to be cut substantially absorbs all the first linearly polarized light so as to prevent the light beam from damaging the adhered object due to poor focusing thereof when the light beam is used to cut the adhesive material, thereby improving the yield of the product.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
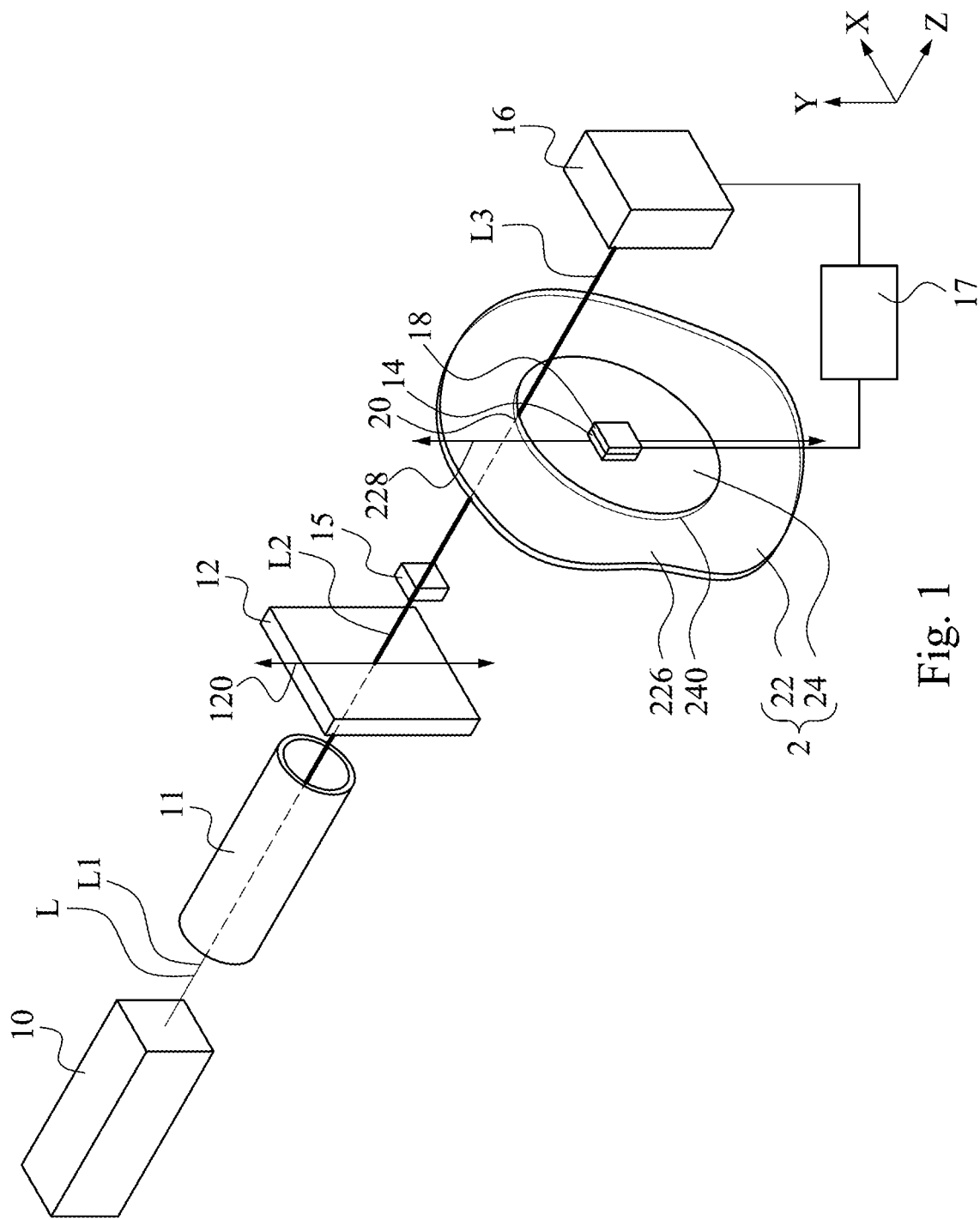
FIG. 1 is a schematic diagram of a laser cutting device in accordance with some embodiments of the present disclosure.

Reference will now be made in detail to the present embodiments of the present disclosure, examples of which are illustrated in the accompanying drawings. Wherever possible, the same reference numbers are used in the drawings and the description to refer to the same or like parts.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Reference is made to FIG. 1. FIG. 1 is a schematic diagram of a laser cutting device 1 in accordance with some embodiments of the present disclosure. The laser cutting device 1 is applied to an object 2 to be cut. In the embodiment, the object 2 includes an adhesive material 22 and an adhered object 24. The adhesive material 22 is a polarizer, and the adhered object 24 is a lens, but the present disclosure is not limited thereto.

As shown in FIG. 1, in the embodiment, the laser cutting device 1 includes a light source 10, a light beam expander 11, a polarization adjusting device 12, a rotary mechanism 14, a focusing element 15, a detector 16, controller 17, and a carrying platform 18. The light source 10, the light beam expander 11, the polarization adjusting device 12, the focusing element 15, and the detector 16 are sequentially arranged along the direction Z. The structure and function of the components and their relationships are described in detail hereinafter.

As shown in FIG. 1, the light source 10 is configured to emit a light beam L including a non-linearly polarized light L1. In the embodiment, the light beam L sequentially passed through the light beam expander 11, the polarization adjusting device 12, and the object 2 and reaches the detector 16. In the embodiment, the light beam L is a laser light. In some embodiments, two orthogonal components of the vibration direction of electric field of the non-linearly polarized light L1 have different phase but the same amplitude. In some embodiments, two orthogonal components of the vibration direction of the electric field of the non-linearly polarized light L1 have different phase and different amplitude.

In some embodiment, the non-linearly polarized light L1 may be a circularly polarized light, but the present disclosure is not limited thereto. In some embodiments, the non-linearly polarized light L1 may be an elliptically polarized light. In some embodiments, a wavelength of the light beam L may depend on optical properties of the adhesive material 22 in the object 2 and a required cutting width on the adhesive material 22. For example, the light beam L is able to select from an infrared area, a visible area, or an ultraviolet area. In the embodiment, the light beam L is a $CO_2$ laser, but the present disclosure is not limited thereto. In some embodiments, the light beam L is able to use an YAG laser (e.g. an Nd: YAG laser) or a fiber laser.

In the embodiment, the polarization adjusting device 12 is disposed between the light source 10 and the object 2, has an optical axis 120, and is used to adjust the non-linearly polarized light L polarization adjusting device 121 into a first linearly polarized light L2. In the embodiment, the polarization adjusting device 12 is a quarter-wave plate. When the non-linearly polarized light L1 passes through the quarter-wave plate, the energy of the non-linearly polarized light L1 will not be absorbed by the quarter-wave plate and be adjusted to the first linearly polarized light L2. That is, the light intensity of the first linearly polarized light L2 is substantially the same as the light intensity of the non-linearly polarized light L1. In some embodiment, the polarization adjusting device 12 is a polarizer. When the non-linearly polarized light L1 passes through the quarter-wave plate, a portion of the energy of the non-linearly polarized light L1 will be absorbed by the polarizer, and the non-linearly polarized light L1 will be adjusted to the first linearly polarized light L2. That is, the light intensity of the first linearly polarized light L2 is lower than the light intensity of the non-linearly polarized light L1.

Figure 2:
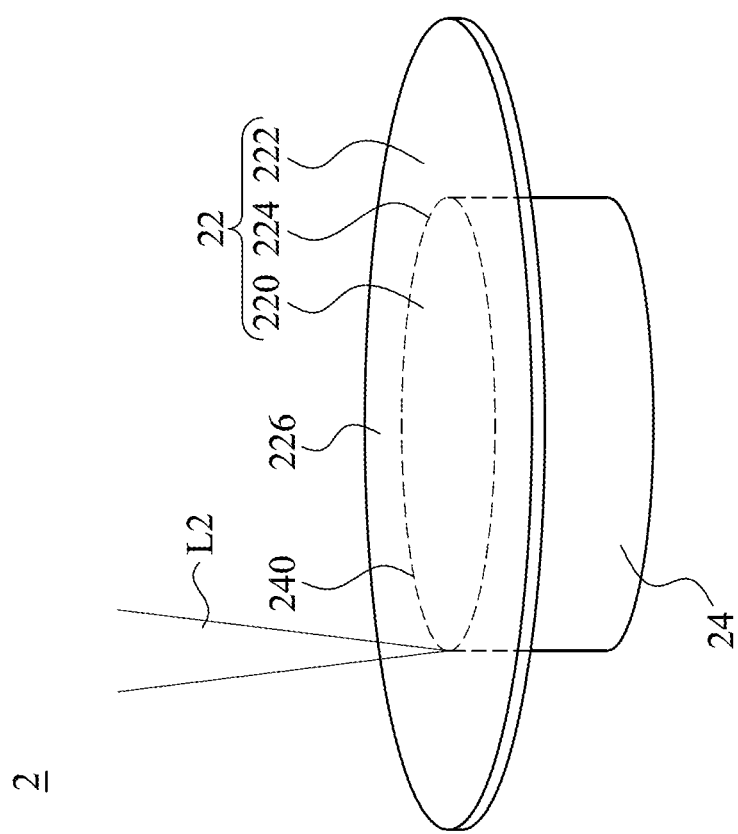
FIG. 2 is a perspective view of an object to be cut in accordance with some embodiments of the present disclosure.

Reference is made to FIGS. 1 and 2. FIG. 2 is a perspective view of the object 2 to be cut in accordance with some embodiments of the present disclosure. As shown in FIG. 2, the adhered object 24 is a three-dimensional shaped element and has a surface 240 facing to the light source 10. The surface 240 of the object 2 is non-flat. That is, the profile of the surface 240 of the object 2 is not the same plane, but the present disclosure is not limited thereto.

In the embodiment, the adhesive material 22 of the object 2 has an adhesive area 226, is a layered structure, and is conformally attached to surface 240 of the adhered object 24. Therefore, the adhesive material 22 of the object 2 has substantially the same profile as the surface 240 of the adhered object 24 and does not lie on the same plane. In the embodiment, the adhesive material 22 is a polarizer and has an optical axis 228 (see FIG. 1). In the embodiment, a method for attaching the adhesive material 22 to the adhered object 24 includes a thermal forming method, but the present disclosure is not limited thereto.

As shown in FIG. 2, the adhesive area 226 of the adhesive material 22 is larger than an area of the surface 240 of the adhered object 24 to ensure that the adhesive material 2 is able to cover the entire surface 240 of the object 24. For example, the adhesive material 22 of the object 2 has a first area 220, a second area 222, and a boundary 224 between the first area 220 and the second area 222. The first area 220 of the adhesive material 22 matches the entire surface 240 of the object 2. The second area 222 of the adhesive material 22 surrounds the object 24 without in contact with the object 24. The boundary 224 of the adhesive material 22 is adjacent to an outer edge of the object 24. In the embodiment, after the adhesive material 22 is attached to the object 24, the first area 220 of the adhesive material 22 will remain, but the second area 222 of the adhesive material 22 will be treated as a residual material and removed.

As shown in FIG. 1, since the adhesive material 22 of the object 2 is a polarizer, when the first linearly polarized light L2 reaches the adhesive material 22, a part of the first linearly polarized light L2 will be absorbed by the adhesive material 22, and the other part of the first linearly polarized light L2 passing through the adhesive material 22 will be adjusted into a second linearly polarized light L3. A direction of polarization of the second linearly polarized light L3 is substantially the same as a direction of polarization of the first linearly polarized light L2 and is parallel to the direction of polarization of the first linearly polarized light L2. The light intensity of the second linearly polarized light L3 is lower than the intensity of the first linearly polarized light L2.

When the adhesive material 22 of the object 2 is cut with the light beam L to remove a portion of the adhesive material 22, the light beam L has to be focused on the adhesive material 22 to form a light spot 20 on the adhesive material 22 and then move the light spot 20 against the material 22 for cutting. However, since the adhesive material 22 of the object 2 is non-flat, when the light beam L is to be focused on the adhesive material 22, the light beam L has to adjust a focus position thereof in the direction Z along with a cutting trajectory.

If the adhesive material 22 of the object 2 is cut by the non-linearly polarized light L1, when the focused position of the non-linearly polarized light L1 does not fall on the adhesive material 22 of the object 2 but falls on the adhered object 24, the non-linearly polarized light L1 will pass through the adhesive material 22 and destroy the F object 24. On the other hand, in the embodiment, since the adhesive material 22 is cut by the first linearly polarized light L2, when the focused position does not fall on the adhesive material 22 but falls on the adhered object 24, most of the first linearly polarized light L2 will be absorbed by the adhesive material 22, and the damage to the adhered object 24 from the first linearly polarized light L2 will be reduced.

Figure 3:
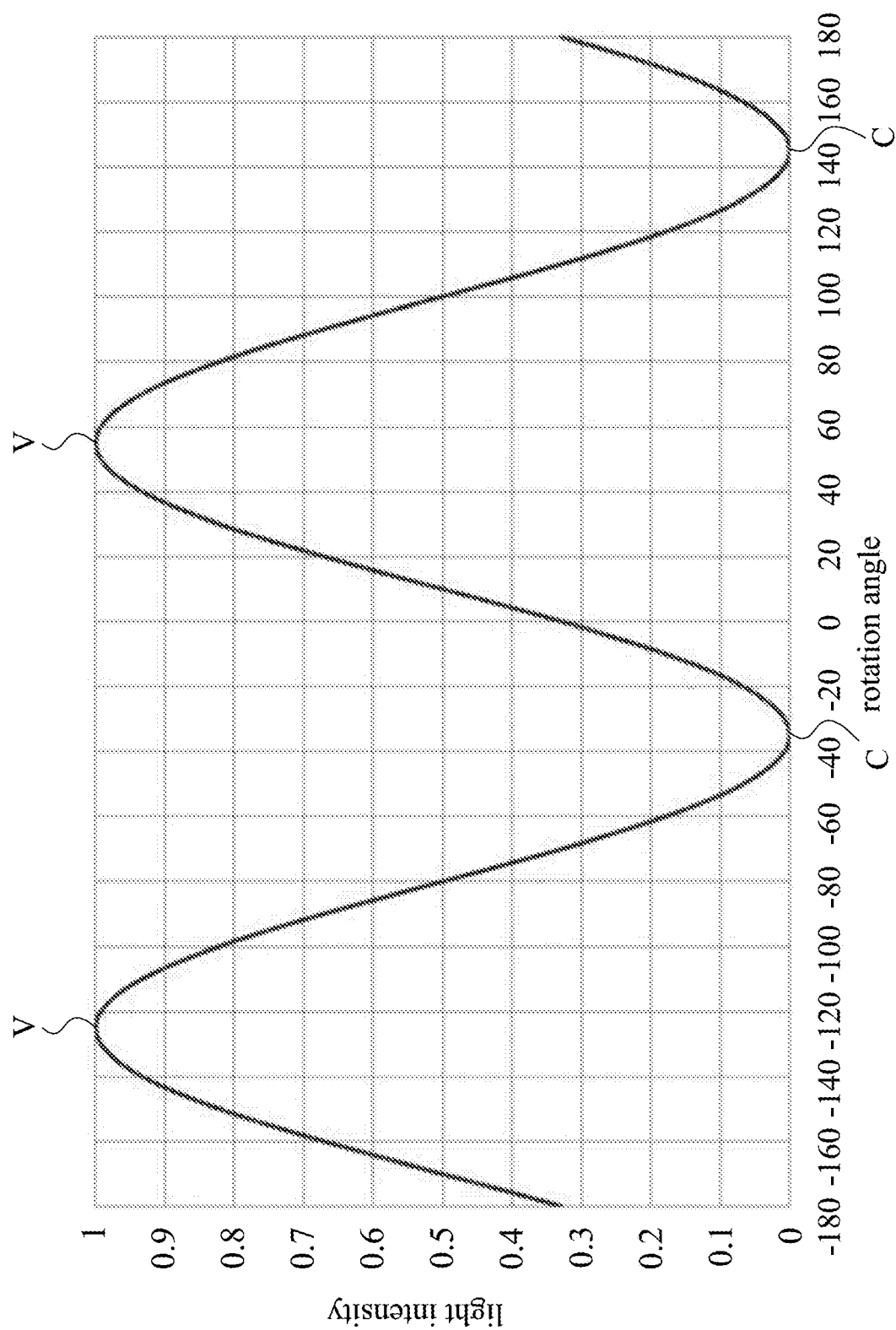
FIG. 3 is an exemplary diagram of light intensity parameters of a second linearly polarized light and rotation angle parameters between an optical axis of the polarization adjusting device and an optical axis of the polarizer in accordance with some embodiments of the present disclosure.

Reference is made to FIGS. 1-3. FIG. 3 is an exemplary diagram of light intensity parameters of the second linearly polarized light L3 and rotation angle parameters between the optical axis 120 of the polarization adjusting device 12 and the optical axis 228 of the adhesive material 22 based on the direction Z in accordance with some embodiments of the present disclosure, in which the light intensity has been normalized, that is, values of the light intensity at different rotation angles are simultaneously divided by the maximum value of the light intensity thereamong. As shown in FIGS. 1-3, in the embodiment, as the optical axis 228 of the adhesive material 22 rotates to different angles relative to the optical axis 120 of the polarization adjusting device 12 based on the direction Z, the second linearly polarized light L3 will have different light intensities.

As shown in FIG. 3, when the optical axis 228 of the adhesive material 22 in the object 2 is rotated about 90 degrees relative to the optical axis 120 of the polarization adjusting device 12, the light intensity of the second linearly polarized light L3 may be able to vary from a high intensity point V to a low intensity point C. That is, when the optical axis 228 of the adhesive material 22 is rotated by 90 degrees relative to the optical axis 120 of the polarization adjusting device 12, the light intensity of the second linearly polarized light L3 will gradually decrease.

In the embodiment, the high intensity point V is the maximum value of the light intensity in the curve shown in FIG. 3, and the low intensity point C is the minimum value of the light intensity in the curve shown in FIG. 3. In the embodiment, the low intensity point C of the second linearly polarized light L3 is substantially equal to zero, but the present disclosure is not limited thereto. In some embodiments, two different values in the curve shown in FIG. 3 are able to be designed as the high intensity point V and the low intensity point C.

In the embodiment, when the light intensity of the second linearly polarized light L3 is at the high intensity point V, the first linearly polarized light L2 will substantially all pass through the adhesive material 22 and will be substantially the same as the second linearly polarized light L3. When the light intensity of the light beam L is between the high intensity point V and the low intensity point C, a part of the first linearly polarized light L2 will be absorbed by the adhesive material 22, and the other part of the first linearly polarized light L2 will pass through the adhesive material 22 and be adjusted to the second linearly polarized light L3. When the light intensity of the light beam L is at the low intensity point C, the first linearly polarized light L2 will be substantially all absorbed by the adhesive material 22.

Hence, in the embodiment, the adhesive material 22 of the object 2 substantially absorbs all the first linearly polarized light L2 so as to prevent the light beam L from damaging the adhered object 24 of the object 2 due to poor focusing thereof when the light beam L is used to cut the adhesive material 22 of the object 2.

In FIG. 1, the rotary mechanism 14 is joined with the object 2 and is configured to rotate the optical axis 228 of the adhesive material 22 in the object 2 relative to the optical axis 120 of the polarization adjusting device 12. In the embodiment, the detector 16 is located at a side of the polarization adjusting device 12 opposite to the light source 10 and is configured to detect the light intensity of the second linearly polarized light L3. When the detector 16 detects that the light intensity of the second linearly polarized light L3 is lower than or substantially equal to the low intensity point C, the detector 16 will transmit a signal to the controller 17. Relatively, in some embodiments, the rotary mechanism 14 may also be joined with the polarization adjusting device 12 and is configured so that the optical axis 120 of the polarization adjusting device 12 rotates relative to the optical axis 228 of the adhesive material 22 in the object 2.

In the embodiment, the controller 17 is configured to receive the signal generated from the detector 16 to further stop the operation of the rotary mechanism 14, so that the optical axis 228 of the adhesive material 22 in the object 2 stops rotating relative to the optical axis 120 of the polarization adjusting device 12. At this time, since the low intensity point C (see FIG. 3) of the light intensity of the second linearly polarized light L3 is substantially equal to zero, the first linearly polarized light L2 is substantially all absorbed by the adhesive material 22. Hence, in the embodiment, the adhesive material 22 of the object 2 substantially absorbs all the first linearly polarized light L2 so as to prevent the light beam L from damaging the adhered object 24 of the object 2 due to poor focusing thereof when the light beam L is used to cut the adhesive material 22 of the object 2.

In the embodiment, the focusing element 15 is located at a side of the polarization adjusting device 12 opposite to the light source 10 and is used to focus the first linearly polarized light L2 and form the light spot 20 on the object 2. In some embodiments, the focusing element 15 is a condenser lens, but the present disclosure is not limited thereto. When the light beam L is set to an appropriate wavelength, power, and/or cutting speed, a position on the object 2 coincident with the light spot 20 will absorb the energy of the light beam L and will be heated to thereby achieve partial melting thereby allowing the object 2 to be cut.

In the embodiment, the carrying platform 18 supports the object 2 and is configured to move in mutually perpendicular directions X, Y, and Z. In some embodiments, the light source 10 is spatially fixed, so by moving the carrying platform 18, the object 2 is moved relative to the light source 10, so that the object 2 moves relative to the first linearly polarized light L2.

Hence, a trajectory of the light spot 20 on the object 2 projecting from the first linearly polarized light L2 is able to be further controlled by controlling a moving direction of the carrying platform 18 to cut the object 2. Moreover, a moving speed of the light spot 20 is able to be further controlled by controlling a moving speed of the carrying platform 18. Selectively, the object 2 is spatially fixed, and the light source 10 and the first linearly polarized light L2 are moved relative to the object 2.

In FIG. 1, the light beam expander 11 is located between the light source 10 and the polarization adjusting device 12 and is configured to expand a beam diameter of the light beam L emitted by the light source 10 and to obtain a homogeneous light beam L. The light beam L emitted from the light source 10 may be expanded by about 2 to about 10 times by the light beam expander 11, but the present disclosure is not limited thereto.

In some embodiments, the light beam expander 11 sequentially includes a first lens and a second lens according to a traveling direction of the light beam L, but the present disclosure is not limited thereto. For example, the first lens is able to be a plano-concave lens. A concave surface of the first lens faces the light source 10, so that the light beam L is emitted from a side of the first lens opposite to the concave surface and is gradually enlarged away from the first lens. Furthermore, the second lens is able to be plano-convex lens. A convex surface of the second lens faces the light source 10, so that the light beam L is emitted from a side of the second lens opposite to the convex surface to form a parallel light beam with the same beam diameter. In some embodiments, the first lens includes a biconcave lens, concave meniscus lens, or any other suitable element. In some embodiments, the second lens includes lenticular lens, convex meniscus lens, or any other suitable element. In some embodiments, the laser cutting device 1 is able to omit the configuration of the light beam expander 11.

Figure 4:
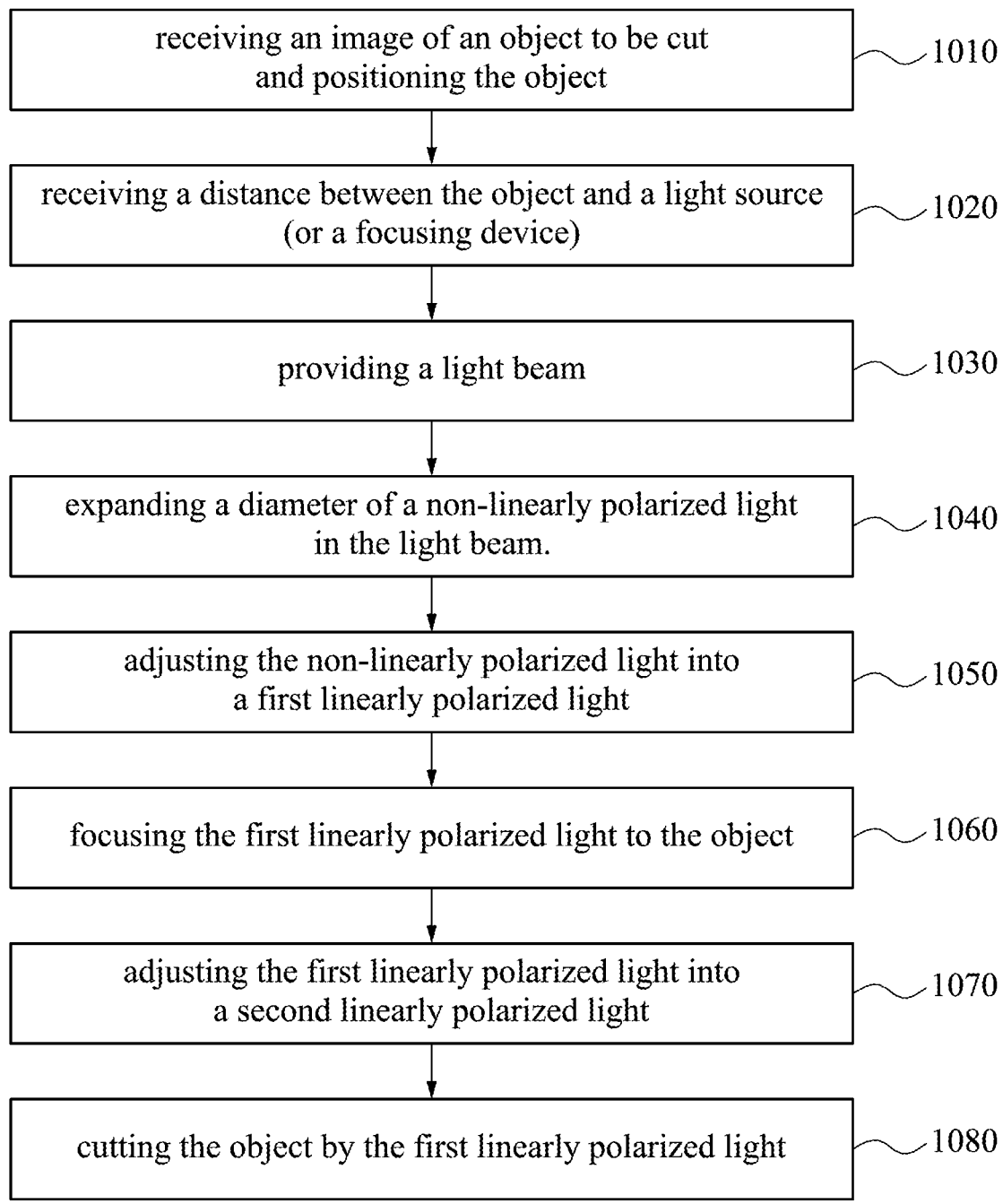
FIGS. 4, 5, and 6 are flowcharts of a laser cutting method respectively in accordance with some embodiments of the present disclosure.
Figure 5:
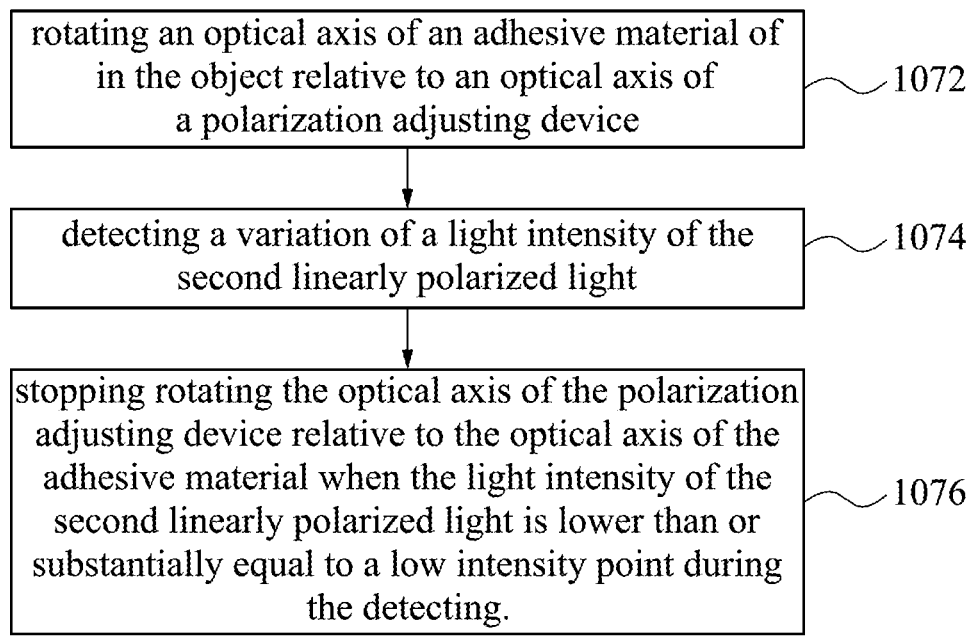
Figure 6:
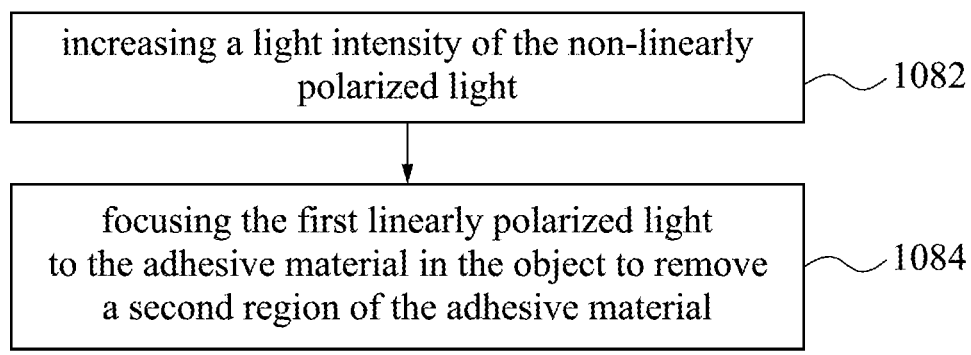

Reference is made to FIGS. 1-6. FIG. 4 is a flowchart of a laser cutting method 1000 in accordance with some embodiments of the present disclosure. FIG. 5 is a flowchart of a step 1070 in the laser cutting method 1000 in accordance with some embodiments of the present disclosure. FIG. 6 is a flowchart of a step 1080 in the laser cutting method 1000 in accordance with some embodiments of the present disclosure. The laser cutting method 1000 is applied to the object 2 to be cut. It is understood that the laser cutting method 1000 has been simplified for a better understanding of the embodiments of the present disclosure. Accordingly, additional processes may be provided before, during, and after the stages of the laser cutting method 1000, and some other processes may be briefly described herein. Specifically, the laser cutting method 1000 includes steps 1010-1084. FIGS. 1-3 illustrate some embodiments corresponding to steps 1010-1084.

In step 1010 shown in FIG. 4, receiving an image of the object 2 to be cut and positioning the object 2. Specifically, the image of the object 1 is obtained on a plane defined by the directions X, Y, and Z, and a relationship between the object 2 and the light source 10 is located. In some embodiments, the image of the object 2 is obtained a plane defined by the directions X and Y, and an image of the boundary 224 (see FIG. 2) on the adhesive material 22 is further obtained.

Hence, in a cutting process, the light source 10 is able to move relative to the object 2 on the plane defined by the directions X and Y based on the boundary 224. Therefore, in the cutting process, the light spot 20 formed by the light source 10 on the object 2 is able to coincide with the boundary 224 to cut the adhesive material 22 along the boundary 224.

In step 1020, receiving a distance between the object 2 and the light source 10 (or the focusing element 15) in the direction Z. Since the adhesive material 22 is non-flat, the distance between the light source 10 and the object 2 in the direction Z is not constant when the light source 10 moves relative to the object 2 in the plane defined by the directions X and Y during the cutting process.

If the light source 10 is focused on the adhered object 24 instead of being focusing on the boundary 224 of the object, the light source 10 will damage the adhered object 24. Therefore, according to the distance detected between the object 2 and the light source 10 (or the focusing element 15), the focusing element 15 moves relative to the object 2 in the direction Z during the cutting process, so that the light source 10 keeps focusing on the boundary 224.

In step 1030, providing the light beam L. The light beam L includes the non-linearly polarized light L1. In the embodiment, the light beam L is a laser light, and the non-linearly polarized light L1 is a circularly polarized light, but the present disclosure is not limited thereto. In some embodiments, the non-linearly polarized light L1 may also be an elliptically polarized light.

In step 1040, passing the non-linearly polarized light L1 through the light beam expander 11 to expand a diameter of the non-linearly polarized light L1.

In step 1050, adjusting the non-linearly polarized light L1 into a first linearly polarized light L2 through the polarization adjusting device 12.

In step 1060, focusing the first linearly polarized light L2 to the object 2 by the focusing element 15 to form the light spot 20 on the object 2.

In step 1070, adjusting the first linearly polarized light L2 into a second linearly polarized light L3 by passing the first linearly polarized light L2 through the adhesive material 22 of the object 2. In some embodiments, when the first linearly polarized light L2 is adjusted, the detector 16 is removed.

In FIG. 5, the step 1070 includes sub-steps 1072, 1074, and 1076. In the sub-step 1072, rotating the optical axis 228 of the adhesive material 22 of in the object 2 relative to the optical axis 120 of the polarization adjusting device 12 by the rotary mechanism 14. In the embodiment, an angle of rotation of the optical axis 228 of the adhesive material 22 relative to the optical axis 120 of the polarization adjusting device 12 is in a range from about 0 degree to about 180 degrees. At this time, the light intensity of the second linearly polarized light L3 passing through the adhesive material 22 is continuously varied. In the embodiment, the light intensity of the second linearly polarized light L3 is reduced.

In sub-step 1074, detecting a variation of the light intensity of the second linearly polarized light L3 by the detector 16. In sub-step 1076, when the detector 16 detects the light intensity of the second linearly polarized light L3 is lower than or substantially equal to the low intensity point C shown in FIG. 4, the detector 16 will transmit a signal to the controller 17.

In the embodiment, when the detector 16 detects the light intensity of the second linearly polarized light L3 is substantially equal to zero (i.e., the low intensity point C is substantially equal to zero), the detector 16 will transmit a signal to the controller 17. The controller 17 receives the signal of the detector 16 and further stops the operation of the rotating mechanism 14, so that the optical axis 228 of the adhesive material 22 in the object stops rotating relative to the optical axis 120 of the polarization adjusting device 12. Therefore, the variation of the light intensity of the second linearly polarized light L3 is stopped, and then the light intensity of the second linearly polarized light L3 is maintained at a low intensity point C. At this time, in the embodiment, the optical axis 228 of the adhesive material 22 is orthogonal to the optical axis 120 of the polarization adjusting element 12.

In step 1080, cutting the object 2 by the first linearly polarized light L2. The step 1080 includes sub-steps 1082 and 1084.

In sub-step 1082, increasing the light intensity of the non-linearly polarized light L1. In some embodiments, the light intensity of the non-linearly polarized light L1 is increased to about two orders of magnitude, but the present disclosure is not limited thereto.

In sub-step 1084, focusing the first linearly polarized light L2 to the adhesive material 22 in the object 2 to remove the second region 222 of the adhesive material 22. In some embodiments, a trajectory of the light spot 20 on the object 2 projecting from the first linearly polarized light L2 is able to be controlled by controlling a moving direction of the carrying platform 18, such that the trajectory of the light spot 20 coincides with the boundary 224 of the adhesive material 22 in the object 2. The light spot 20 cuts the object 2 along the boundary line 224 on the adhesive material 22 to remove the second region 222 of the adhesive material 22. In some embodiments, the object 2 is spatially fixed, and the first linearly polarized light L2 moves relative to the object 2 to cut the object 2.

According to the foregoing embodiments of the disclosure, it can be seen that, in the embodiment, the non-linearly polarized light is adjusted into the first linearly polarized light and is focused on the adhesive material of the object to be cut. Further, the first linearly polarized light is adjusted into the second linearly polarized light through the adhesive material. When the detector detects that the light intensity of the second linearly polarized light is lower than or substantially equal to the low intensity point, the light intensity of the non-linearly polarized light will be increased to remove the second area of the adhesive material. Hence, the adhesive material of the object to be cut substantially absorbs all the first linearly polarized light so as to prevent the light beam from damaging the adhered object due to poor focusing thereof when the light beam is used to cut the adhesive material, thereby improving a yield of the product.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A laser cutting method applied to cut a first polarizer, the method comprising:
   providing a non-linearly polarized light;
   adjusting the non-linearly polarized light to a first linearly polarized light by a polarization adjusting device;
   rotating a first optical axis of the polarization adjusting device relative to a second optical axis of the first polarizer to reduce a light intensity of a second linearly polarized light that is formed after the first linearly polarized light passing through the first polarizer;
   detecting the light intensity of the second linearly polarized light through a detector located at a side of the first polarizer opposite to the polarization adjusting device during the step of rotating the first optical axis of the polarization adjusting device relative to the second optical axis of the first polarizer;
   when the light intensity of the second linearly polarized light is equal to a low intensity point, stopping the step of rotating the first optical axis of the polarization adjusting device relative to the second optical axis of the first polarizer; and
   cutting the first polarizer by the first linearly polarized light after the step of stopping the step of rotating the first optical axis of the polarization adjusting device relative to the second optical axis of the first polarizer.

2. The method of claim 1, further comprising:
   focusing the first linearly polarized light to the first polarizer prior to the step of rotating the first optical axis of the polarization adjusting device relative to the second optical axis of the first polarizer.

3. The method of claim 1, wherein the cutting the first polarizer by the first linearly polarized light comprises:
   increasing a light intensity of the non-linearly polarized light to cut the first polarizer.

4. The method of claim 1, wherein the adjusting the non-linearly polarized light to the first linearly polarized light by the polarization adjusting device is adjusting the non-linearly polarized light to the first linearly polarized light by a second polarizer.

5. The method of claim 1, wherein the adjusting the non-linearly polarized light to the first linearly polarized light by the polarization adjusting device is adjusting the non-linearly polarized light to the first linearly polarized light by a quarter-wave plate.

* * * * *